United States Patent
Savolainen et al.

(10) Patent No.: US 6,868,280 B2
(45) Date of Patent: Mar. 15, 2005

(54) METHOD AND APPARATUS FOR ENTERING INFORMATION IN A MOBILE DEVICE WITH SPECIAL CHARACTERS

(75) Inventors: Minna-Mari Savolainen, Oulu (FI); Petri Laukkanen, Pirkkala (FI); Truong Minh Tu, Ho Chi Minh (VN); Seppo Helle, Paimio (FI)

(73) Assignee: Nokia Corporation, Espoo (FI)

( * ) Notice: Subject to any disclaimer, the term of this patent is extended or adjusted under 35 U.S.C. 154(b) by 638 days.

(21) Appl. No.: 09/798,350

(22) Filed: Mar. 2, 2001

(65) Prior Publication Data

US 2002/0123367 A1 Sep. 5, 2002

(51) Int. Cl.⁷ .................................................. H04B 1/38
(52) U.S. Cl. ............................. 455/550.1; 379/88.06; 379/368; 341/22
(58) Field of Search .............................. 455/550.1, 425, 455/575.1, 557, 556.1, 556.2, 344, 414.4; 340/735, 745, 724, 751; 341/22, 26, 28, 20; 400/110; 379/368, 93.19, 93.18, 93.27, 433.08, 433.07, 88.06; 708/142, 145; 707/535, 536; 345/168, 171, 636, 467, 689, 169; 715/535, 536; 704/8, 9, 10

(56) References Cited

U.S. PATENT DOCUMENTS

| | | | |
|---|---|---|---|
| 4,603,330 A * | 7/1986 | Horne et al. ................ | 345/467 |
| 5,945,928 A | 8/1999 | Kushler et al. ............... | 341/28 |
| 6,009,444 A | 12/1999 | Chen .......................... | 707/535 |
| 6,170,000 B1 | 1/2001 | Bories et al. ............... | 707/535 |
| 6,459,390 B1 * | 10/2002 | Kim ............................ | 341/20 |
| 6,631,501 B1 * | 10/2003 | Jurion et al. ................ | 715/535 |
| 6,646,573 B1 * | 11/2003 | Kushler et al. ............... | 341/28 |

FOREIGN PATENT DOCUMENTS

| | | | | |
|---|---|---|---|---|
| EP | 0588538 | 3/1994 | ........... | G06F/3/023 |
| EP | 0660216 | 6/1995 | ........... | G06F/3/023 |
| JP | 62105265 | 5/1987 | ........... | G06F/15/20 |
| JP | 62274360 | 11/1987 | ........... | G06F/15/20 |

\* cited by examiner

*Primary Examiner*—Edward F. Urban
*Assistant Examiner*—C. Chow
(74) *Attorney, Agent, or Firm*—Ware, fressola, Van der Sluys & Adolphson LLP

(57) ABSTRACT

A method of changing an alphabetic character to a variant character when entering information or messages in a mobile phone or a game console or the like. The variant character can be a diacritical variation or a tonal variation of the alphabetic character. After an alphabetic character is entered and displayed on a display device, the star key in the keypad can be used to replace the displayed alphabetic character with a desired one of the variants.

17 Claims, 10 Drawing Sheets

| CIRCUMFLEX | BREVE | HORN |
|---|---|---|
| â ê ô | ă | ơ ư |

FIG. 1

| NEUTRAL | ACUTE ACCENT | TILDE | GRAVE ACCENT | HOOK ABOVE | DOT BELOW |
|---|---|---|---|---|---|
| g a | g á | g à | g à̉ | g ã | g ạ |

FIG. 2

| a | e | i | o | u |
|---|---|---|---|---|
| ao | eo | ia | oi | ua |
| âu | êu | iê | oa | ưa |
| ay |  | iêu |  | uyê |

FIG. 3

| NEUTRAL | ACUTE ACCENT | TILDE | GRAVE ACCENT | HOOK ABOVE | DOT BELOW |
|---------|--------------|-------|--------------|------------|-----------|
| hai<br>ngeo<br>triêu<br>thuy<br>nguyên | thúy | ngẽo | nguyền | hải | triệu |

FIG. 4

| BASIC VOWEL | ACUTE ACCENT | TILDE | GRAVE ACCENT | HOOK ABOVE | DOT BELOW |
|---|---|---|---|---|---|
| A | Á | À | Ả | Ã | Ạ |
| a | á | à | ả | ã | ạ |
| Â | Ấ | Ầ | Ẩ | Ẫ | Ậ |
| â | ấ | ầ | ẩ | ẫ | ậ |
| Ă | Ắ | Ằ | Ẳ | Ẵ | Ặ |
| ă | ắ | ằ | ẳ | ẵ | ặ |
| E | É | È | Ẻ | Ẽ | Ẹ |
| e | é | è | ẻ | ẽ | ẹ |
| Ê | Ế | Ề | Ể | Ễ | Ệ |
| ê | ế | ề | ể | ễ | ệ |
| I | Í | Ì | Ỉ | Ĩ | Ị |
| i | í | ì | ỉ | ĩ | ị |
| O | Ó | Ò | Ỏ | Õ | Ọ |
| o | ó | ò | ỏ | õ | ọ |
| Ô | Ố | Ồ | Ổ | Ỗ | Ộ |
| ô | ố | ồ | ổ | ỗ | ộ |
| Ơ | Ớ | Ờ | Ở | Ỡ | Ợ |
| ơ | ớ | ờ | ở | ỡ | ợ |
| U | Ú | Ù | Ủ | Ũ | Ụ |
| u | ú | ù | ủ | ũ | ụ |
| Ư | Ứ | Ừ | Ử | Ữ | Ự |
| ư | ứ | ừ | ử | ữ | ự |
| Y | Ý | Ỳ | Ỷ | Ỹ | Ỵ |
| y | ý | ỳ | ỷ | ỹ | ỵ |

FIG. 5

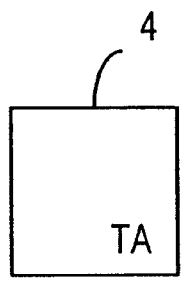 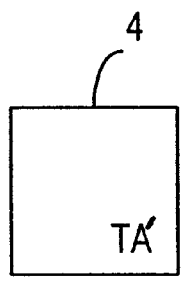 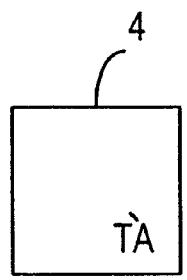 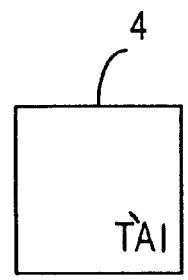
FIG.9a   FIG.9b   FIG.9c   FIG.9d
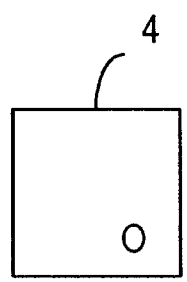 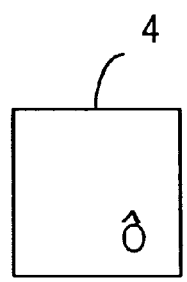 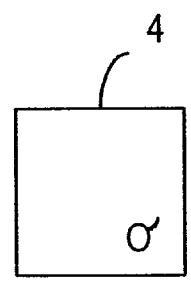
FIG.10a   FIG.10b   FIG.10c
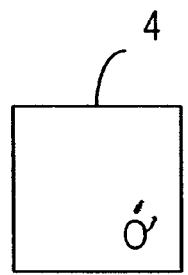 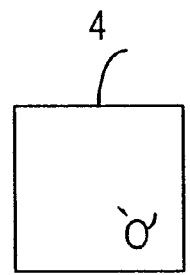
FIG.10d   FIG.10e

METHOD AND APPARATUS FOR ENTERING INFORMATION IN A MOBILE DEVICE WITH SPECIAL CHARACTERS

BACKGROUND OF THE INVENTION

Vietnamese is a member of Southeast Asian languages. It is written from left to right and based on Latin script although it contains some Vietnamese special characters. In Vietnamese, characters can appear both in upper and lower cases. Like Chinese and Thai, Vietnamese is a tonal language. This means that the way a word is pronounced determines its meaning.

In the Vietnamese language, there are seventeen (BCDĐGHKLMNPQRSTVX) consonants in both upper and lower cases, resulting in thirty-four consonants. Among these consonants, thirty-two can be found in the regular English alphabet, and two exceptions are Đ and đ (D and d with stroke). The Vietnamese alphabet includes twelve vowels, six of which are common to western languages: a, e, i, o, u and y. The remaining six are represented by combining diacritics into regular vowels: â (a with circumflex), ă (a with breve), ê (e with circumflex), ô (o with circumflex), ơ (o with horn) and ư (u with horn), as shown in FIG. 1.

Furthermore, in the Vietnamese language, there are six different tones. Five of the tones, excluding the neutral tone, are marked with tone marks, occurring with any one of the twelve vowels. Symbolically, the six different tones can be referred to as neutral, acute accent, tilde, grave accent, hook above and dot below. FIG. 2 shows the tonal variations for the word "ga".

Vowels can be used in combination. Some examples are shown in FIG. 3. When vowels are used in a combined form, only one tonal mark is required to change the tone. For example, there are two or more vowels in the following word: "hai", "ngeo", "tieu", "thuy", "nguyen", but only one tonal mark is used in each word, as shown in FIG. 4.

Each of the twelve vowels can occur in any of the six tones. Accordingly, the combination of vowels with tonal marks results in 72 vowels, both in upper and lower case. The overall number of vowels in Vietnamese, including the tonal variations, is 144, as shown in FIG. 5.

In a regular telephone keypad, as shown in FIG. 6, usually eight keys are used for entering alphabetic characters. As shown in FIG. 6, the telephone set 1 has a keypad 10, only keys 102, 103, 104, 105, 106, 107, 108 and 109 are used for entering alphabetic characters:

2ABC, 3DEF, 4GHI, 5JKL, 6MNO, 7PQRS, 8TUV, 9WXYZ

In addition, as shown in FIG. 1, the keypad 10 has at least four other keys 101, 110, 111 and 112:

1, *, 0, #

As shown in FIG. 1, the telephone 1 also has a display 4 operatively connected to the keypad 10 for displaying the entered alphabetic characters.

Even if a message is entered through a phone with either upper case or lower case, there are not enough keys to enter a message in Vietnamese, mainly because of the 144 vowels.

Thus, it is advantageous and desirable to provide a method for entering a message or information in Vietnamese in a telephone using the keys on the telephone keypad.

SUMMARY OF THE INVENTION

It is a primary object of the present invention to provide a method for entering a message or information in Vietnamese or other languages that have special characters and/or tonal marks using a regular telephone keypad. This object can be achieved by using one or more function keys of the keypad to change a regular alphabetic character to a special character, wherein the special character can be a variation of the alphabetic character, or the same alphabetic character with a tonal mark.

Thus, according to the first aspect of the present invention, a method of changing an alphabetic character to a variant thereof for entering information or messages in a telephone, wherein the telephone comprises:

a keypad having alphanumeric keys for entering the alphabetic character; and means, operatively connecting the keypad to a display, for displaying the alphabetic character, wherein the keypad includes one or more function keys. The method comprises the steps of:

entering the alphabetic character to be changed; and pressing at least one function key until the displayed alphabetic character is substituted by the corresponding variant.

In particular, when the function keys include a star key (*) and a pound key (#), it is preferable to press the star key to change the entered alphabetic character. However, it is possible to press the pound key to make a similar change, and it is also possible to use both the star and the pound keys simultaneously or sequentially to make the intended change.

Preferably, the alphabetic character to be changed represents a vowel, but it is also possible to change a consonant character to a corresponding variant.

Preferably, when the entered alphabetic character has a plurality of different variants, one of the different variants is chosen based on the number of times the star key is pressed. It is also possible to choose one of the different variants based on the time duration for which the star key is pressed.

Preferably, the variant represents a tonal variation of the entered vowel character, but it is possible that the special character represents a modification of the sound of the entered vowel character.

According to the second aspect of the present invention, a mobile device having a keypad having alphanumeric keys for entering an alphabetic character; and means, operatively connecting the keypad to a display, for displaying the entered alphabetic character, wherein the keypad includes one or more function keys for changing the entered alphabetic character to a variant thereof by pressing said one or more function keys, said mobile device comprising:

means, responsive to said pressing and the entered alphabetic character, for choosing the variant character corresponding to the entered alphabetic character for providing a signal indicating the chosen variant character; and means, responsive to the signal, for causing the chosen variant character to be displayed in place of the entered alphabetic character.

Preferably, when the function keys include a star key and a pound key, it is preferable to press at least the star key to change the entered alphabetic character. However, it is possible to press the pound key to make a similar change, and it is also possible to use both the star and the pound keys simultaneously or sequentially to make the intended change.

Preferably, the alphabetic character to be changed represents a vowel, but it is also possible to change a consonant character to a corresponding special character.

Preferably, when the entered alphabetic character has a plurality of different variants, one of the different variants is chosen based on the number of times the star key is pressed. It is also possible to choose one of the different variants based on the time duration for which the star key is pressed.

Preferably, the choosing means comprises a lookup table for choosing the variant character corresponding to the entered alphabetic character based on the number of times the star key is pressed or the time duration in which the star key is pressed.

According to the third aspect of the present invention, a keypad having alphanumeric keys for entering an alphabetic character in an electronic device, wherein the electronic device has a display operatively connected to the keypad for displaying the entered alphabetic character, said keypad comprising:

at least one further key different from the alphanumeric keys for changing the entered alphabetic character to a variant thereof when said further key is pressed one or more times.

Preferably, the further key comprises a star key.

Alternatively, the further key comprises a pound key.

The present invention will become apparent upon reading the description taken in conjunction with FIGS. 7a to 10e.

BRIEF DESCRIPTION OF THE DRAWINGS

FIG. 1 is a chart showing the diacritical variations of Vietnamese vowels.

FIG. 2 is a chart illustrating the tonal variations of Vietnamese vowels.

FIG. 3 illustrates the combination of vowels in the Vietnamese language.

FIG. 4 illustrates the use of tonal marks on words with two or more vowels.

FIG. 5 is a table listing the 144 Vietnamese vowels, including diacritical variations and tonal variations.

FIG. 9a illustrates a vowel character being entered and displayed.

FIG. 9b illustrates a first tonal mark appearing on the entered vowel character.

FIG. 9c illustrates a second tonal mark appearing on the entered vowel character.

FIG. 9d illustrates another alphabetic character being entered to form a complete word.

FIG. 10a illustrates a vowel character being entered and displayed.

FIG. 10b illustrates the entered vowel character being replaced by the first diacritical variation thereof.

FIG. 10c illustrates the first diacritical variation being replaced by the second diacritical variation.

FIG. 10d illustrates the first tonal mark being put on the second diacritical variation.

FIG. 10e illustrates the first tonal mark being replaced by the second tonal mark.

DETAILED DESCRIPTION OF THE INVENTION

Figure 7A:
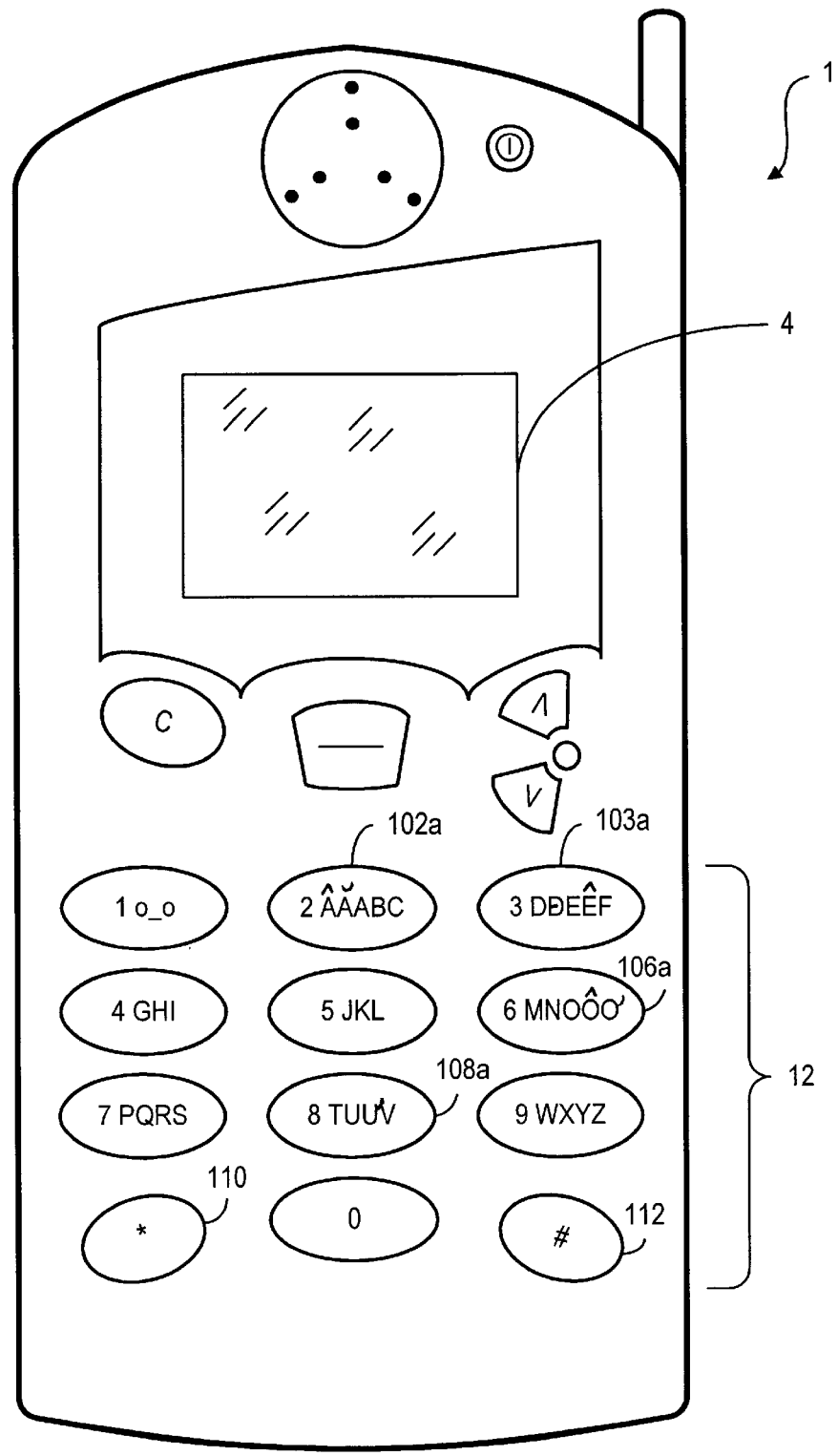
FIG. 7a is a diagrammatic representation of a telephone having a keypad having special alphanumerical keys for entering messages in Vietnamese.

In the preferred embodiment of the present invention, as shown in FIG. 7a, the telephone 1 has a keypad 12 for entering information in a language that has diacritical variants.

As shown, key 102a shows two diacritical variations of the vowel "A"; key 103a shows one diacritical variation of the vowel "E" and a special character "Đ" (D with a stroke); key 106a shows two diacritical variations of the vowel "O"; and key 108a shows one diacritical variation of the vowel "U". In order to enter an alphabetic character shown on a particular key, one can tap that key for a number of times until the desired alphabetic character is displayed in the display 4. Tapping a key to enter an alphabetic character is known in the art. In order to choose a tonal variation of a word, however, one must use a different key. According to the present invention, it is possible to use the star key (*) 110 to put a tonal mark on an entered alphabetic character. In particular, the star key 110 can be used to put a tonal mark on an entered vowel (including the diacritical variations thereof). It is preferred that the tonal variations are arranged in a certain order, such as "acute accent", "tilde", "grave accent", "hook above" and "dot below". With this arrangement, if it is desirable to put the "grave accent" on an entered vowel, one can simply tap the star key three times. The steps of putting a desirable tonal mark on an entered vowel, according to the present invention, are shown in FIGS. 9a to 9d. For example, if it is desirable to put the "tilde" on the word "TAI", one must first enter the letter "T" and the letter "A", as shown in FIG. 9a, using keys 108a and 102a. Tapping the star key 110 once, one will see the "acute accent" mark appears on top of the letter "A", as shown in FIG. 9b. Tapping the star key 110 again, one will see the "tilde" mark appears on top of the letter "A", as shown in FIG. 9c. The desired word can now be entered by tapping key 104 to enter the letter "I", as shown in FIG. 9d.

The five tone marks, and the neutral tone, can be arranged to appear in a cyclic manner. For example, if the star key 110 is tapped six times, the tone mark disappears. If the star key 110 is tapped once or seven times, the "acute accent" mark would appear.

Alternatively, one can keep pressing the star key 110 for a longer period of time to cycle through a series of tone marks appearing on the display, one at a time in a sequential and cyclic manner.

Figure 7B:
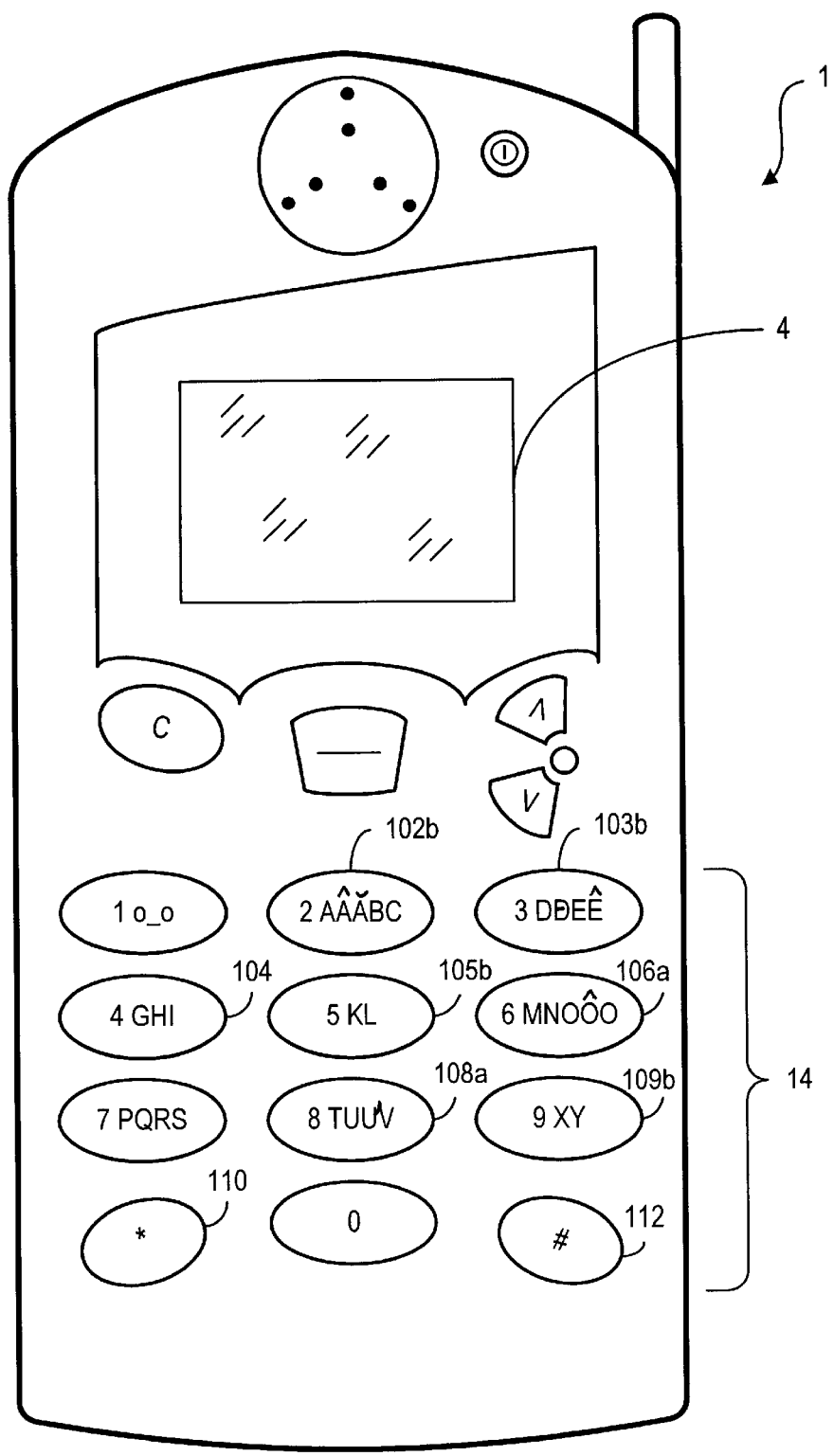
FIG. 7b is a diagrammatic representation of a telephone having a different keypad for entering messages in Vietnamese.

It should be noted that the consonants "f", "j", "w" and "z" are not used in Vietnamese. Thus, it is possible to eliminate these consonant characters from the keypad 16, as shown in FIG. 7b, if so desired. Also, the letter "q" in Vietnamese always appears with "u" as "qu", and no tonal mark would appear on the u in qu. Thus, it is also possible to replace "q" with "qu" in a keypad to eliminate the need of entering "u" after "q"—in a message entered in either upper case or lower case.

In a non-tonal language, such as French and German, the star key can be used to add a diacritic on a vowel character. For example, by tapping the star key once after entering the letter "U", one can reach the umlaut mark to obtain "Ü" for modify the sound of the vowel or the pronunciation of a word. It is possible to tap the star key again to cancel the umlaut mark.

Figure 7C:
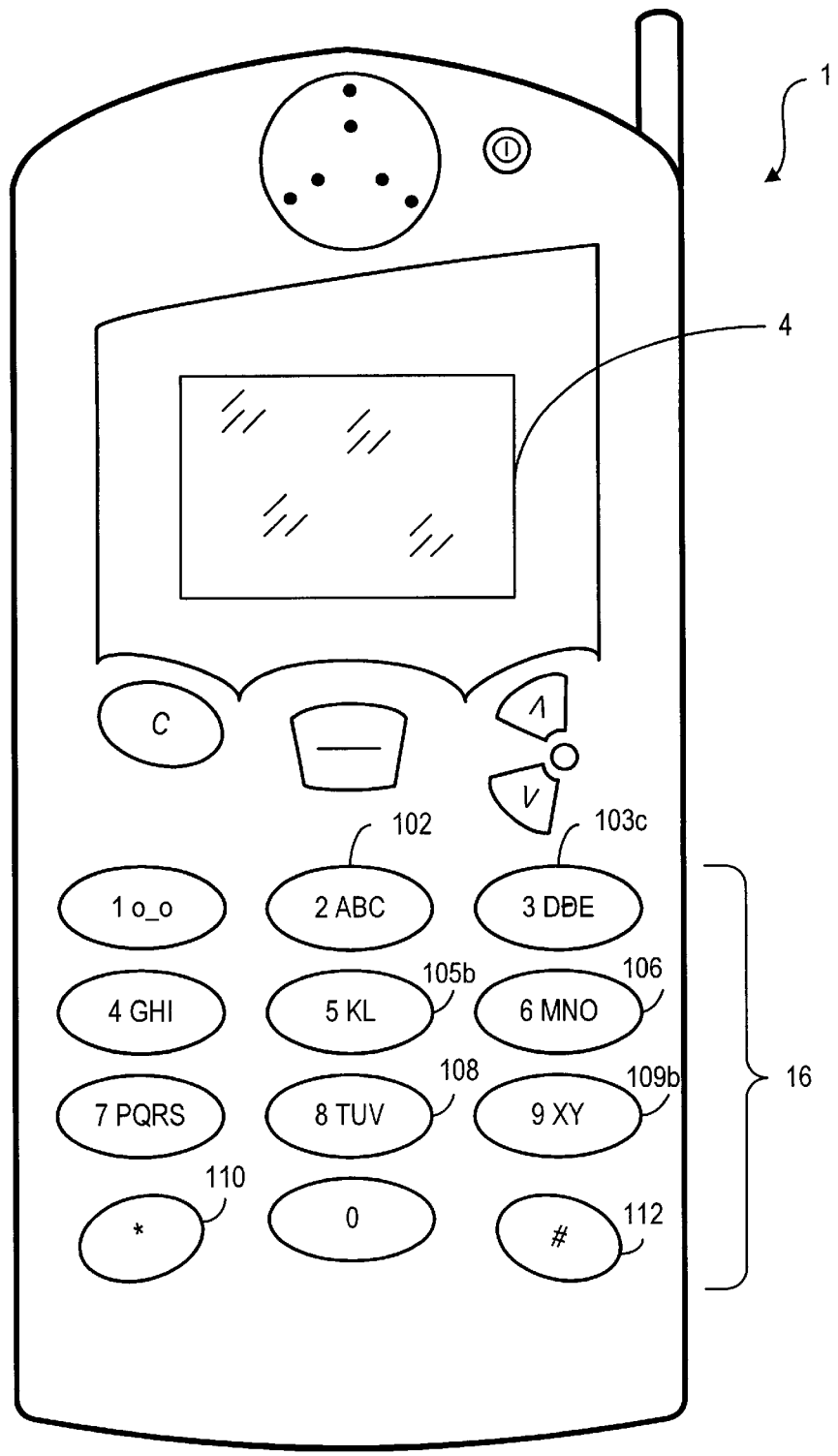
FIG. 7c is a diagrammatic representation of a telephone having a simpler keypad for entering messages in Vietnamese.

It is possible to use a keypad 16, as shown in FIG. 7c to enter a message in Vietnamese by using the star key 110, the pound key 112 or both to reach a diacritical variation of a vowel. For example, one can use short taps on the star key 110 to reach a diacritical variation and use a long press of the star key 110 to cycle through the tonal marks. As shown in FIG. 10a, one can tap key 106 a number of times to reach the letter "0". If the star key 110 is briefly tapped once, the diacritical variation with circumflex would appear, as shown in FIG. 10b. If the star key 110 is briefly tapped again, the diacritical variation with breve would appear, as shown in FIG. 10c. If the star key 110 is pressed firmly for a period of time, the "acute accent" mark would appear, as shown in FIG. 10d. If one keeps pressing the star key 110, the "tilde" mark would appear, as shown in FIG. 10e. Alternatively, one can briefly tap the star key 110 to reach a tonal variation and press the star key 110 for a longer period to reach the diacritical variation. Alternatively, one can use the pound key (#) 112 to reach a diacritical variation of a letter and use the star key 110 to reach a tonal variation of an entered vowel character. The unique feature of the present invention is the use of one or more "function keys", such as the star key 110 and the pound key 112, to reach a diacritical variation of an alphabetic character, or a tonal variation of a vowel.

Figure 7D:
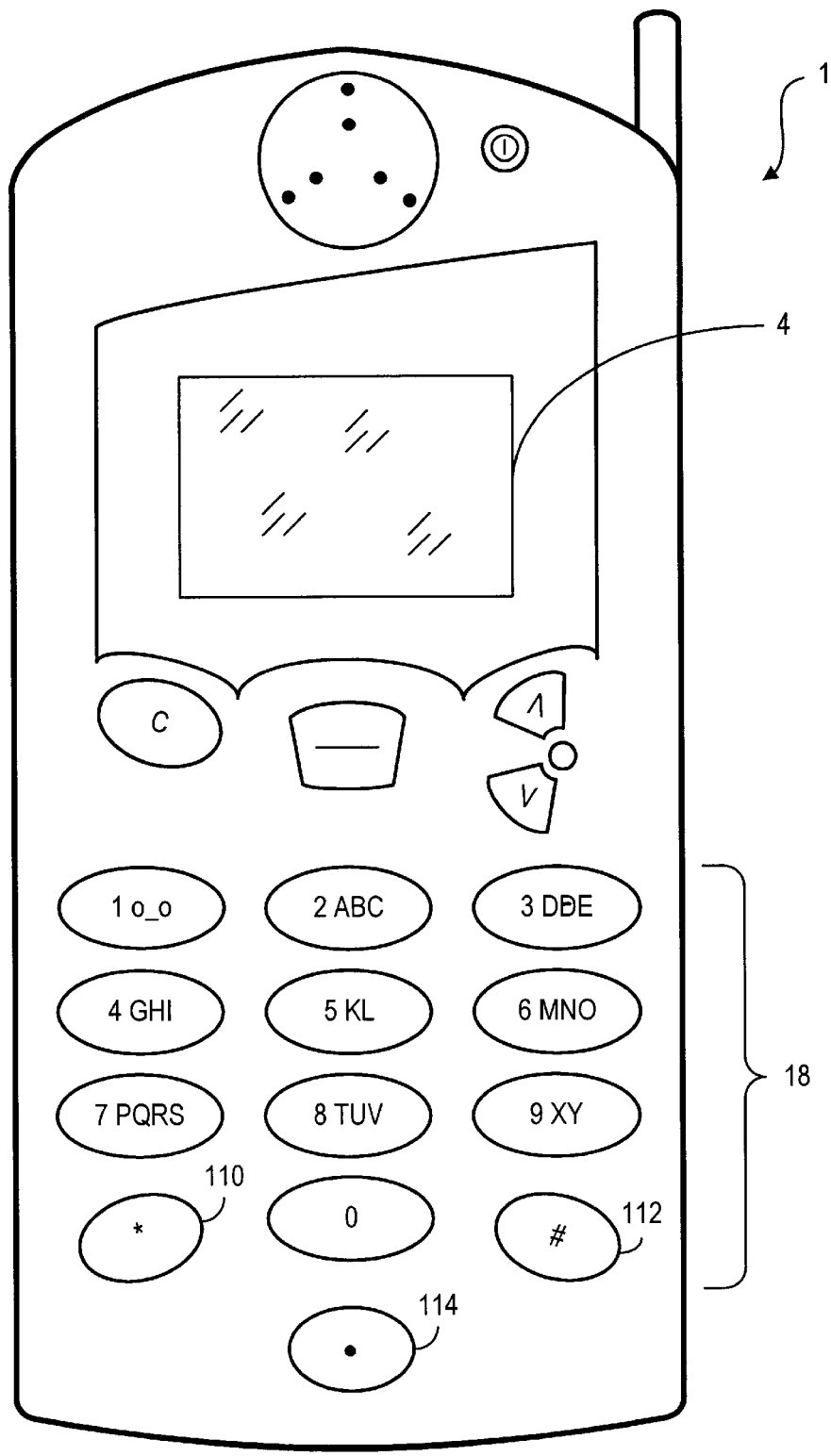
FIG. 7d is a diagrammatic representation of a telephone having yet another keypad for entering messages in Vietnamese.

Thus, the present invention is applicable not only on a tonal language, such as Vietnamese, Thai and Chinese (when written in Latin script with tonal variations), but also on non-tonal languages such as French (à, â, ç, è, é, ê, ô) and German (ü). Also, it is also possible to put an additional key 114, as shown in FIG. 7d, on the keypad 18 to reach a variant of an entered alphabetic character, or non-alphabetic character.

Figure 6:
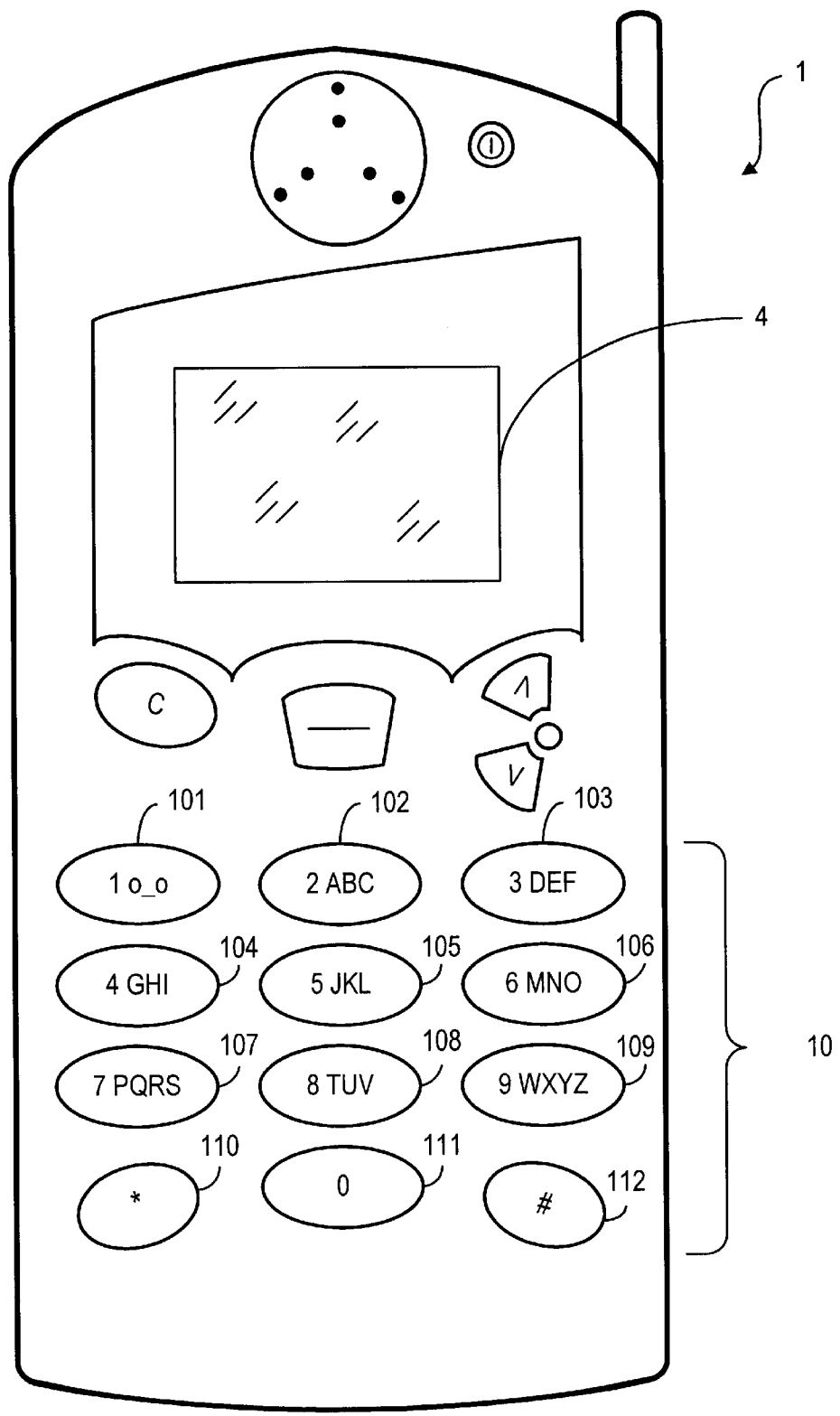
FIG. 6 is diagrammatic representation of a telephone having a regular keypad.

It is also possible to use a regular keypad, as shown in FIG. 6, to enter a message in Vietnamese by using a star key 110, the pound key 112 or both to reach Đ from D, in addition to the steps as described in conjunction with FIG. 7c.

Figure 8:
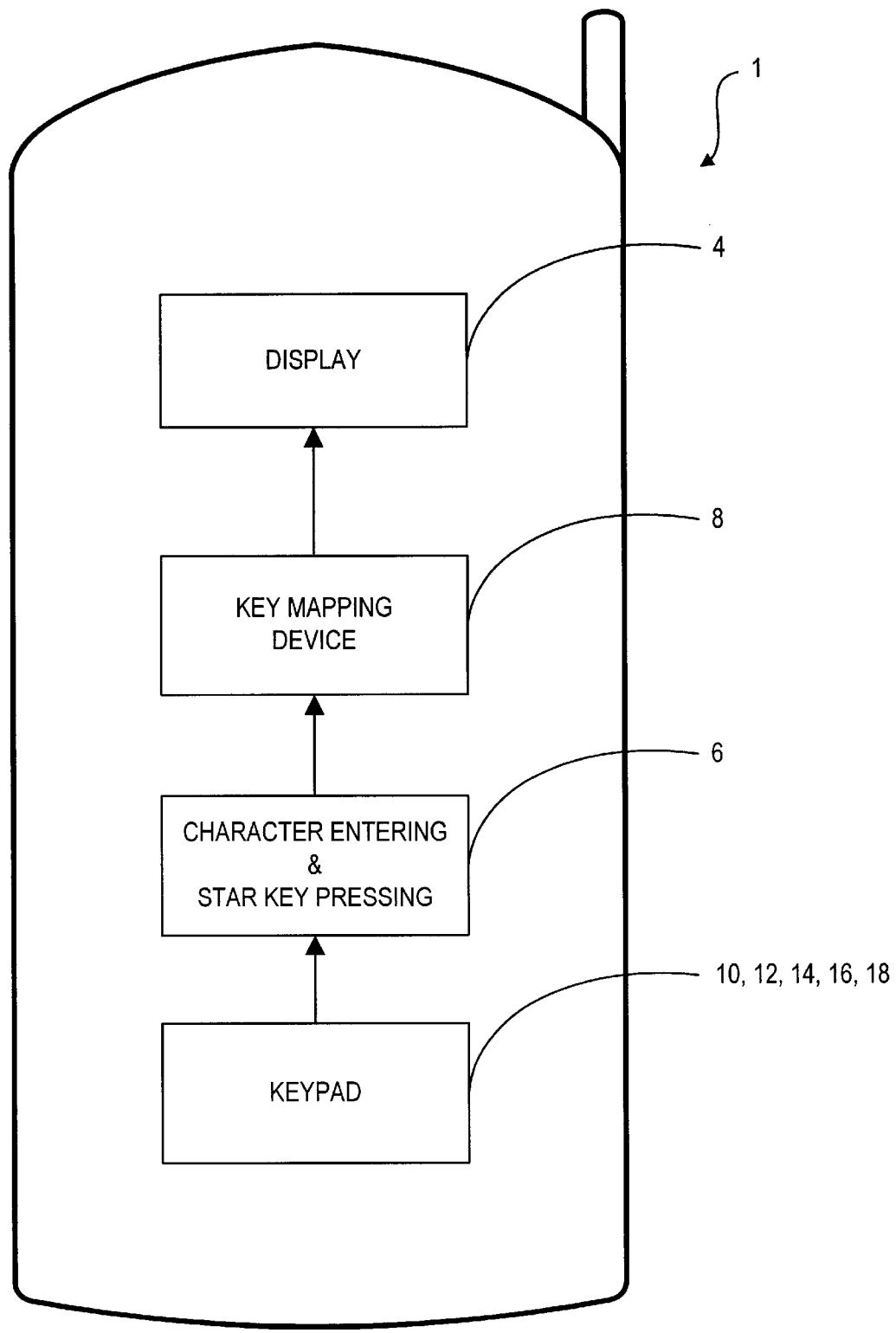
FIG. 8 is a diagrammatic representation of a telephone having a lookup table for key-mapping.

FIG. 8 shows that the telephone 1 further comprises means 6, responding to the pressed alphanumeric key and the pressing of the star key, for providing a signal, indicating the entered alphabetic key and the manner in which the star key is pressed, to a key-mapping mechanism 8. Responding to the signal, the key-mapping means 8 causes the entered alphabetic character to be displayed in the display 4. The means 8 further determines a variant corresponding to the entered alphabetic character and the manner in which the star key is pressed. The key-mapping means 8 further causes the chosen variant to be displayed in the display 4, in place of the entered alphabetic character.

Furthermore, with the use of star key 110, the pound key 112, the special key 114, or the combination of these keys, one can enter a message containing numerals and symbols such as +, &, @, ☺, :) and %.

It should be noted that the present invention has been described mainly in conjunction with a telephone having alphanumeric keys for entering alphabetic characters and numerals, and a star key or pound key for entering one or more variants of the alphabetic characters. The present invention, in general, is applicable to an electronic device having a keypad containing a plurality of first keys and at least one second key, wherein the first keys are used to enter messages or information in symbolic characters and the second key is used to select one or more variants of the entered symbolic character. The symbolic characters may comprise alphabetic characters, numerals, signs, icon-like pictures, simple drawings, images, marks and the like. The electronic device can be a land-line telephone, a mobile phone, a game console and the like.

Thus, although the invention has been described with respect to a preferred embodiment thereof, it will be understood by those skilled in the art that the foregoing and various other changes, omissions and deviations in the form and detail thereof may be made without departing from the spirit and scope of this invention.

What is claimed is:

1. A method of changing a symbolic character to a variant character thereof for entering information or messages in a mobile device, wherein the mobile device comprises:

a keypad having a plurality of first keys far entering the symbolic character; and means, operatively connecting the keypad to a display, for displaying the symbolic character, wherein the keypad includes one second key different from the first keys for effecting said changing, said method comprising;

entering the symbolic character to be changed; and pressing the second key one or more times until the displayed symbolic character is replaced by the corresponding variant character, wherein the displayed symbolic character comprises a voiced alphabetic character which has one or more voiced tonal variant characters different only in sound frequencies, and wherein the second key is used to select the one or more tonal variant characters.

2. The method of claim 1, wherein the variant character represent a modification of sound of the symbolic character to be changed.

3. A method of changing a symbolic character to a variant character thereof for entering information or messages in a mobile device, wherein the mobile device comprises:

a keypad having a plurality of first keys for entering the symbolic character; and means, operatively connecting the keypad to a display, for displaying the symbolic character, wherein the keypad includes one second key different from the first keys for effecting said changing, said method comprising:

entering the symbolic character to be changed; and pressing the second key one or more times until the displayed symbolic character is replaced by the corresponding variant character, wherein the displayed symbolic character comprises an alphabetic character which has one or more tonal variant characters and one or more diacritical variant characters, and wherein the second key is manipulated in a first manner to select the one or more diacritical variant characters, and in a second manner to select the one or more tonal variant characters.

4. The method of claim 3, wherein the first manner is tapping and the second manner is pressing for a longer period than tapping.

5. The method of claim 3, wherein the second manner is tapping and the first manner is pressing for a longer period than tapping.

6. The method of claim 3, wherein the tonal variants are different from the diacritical variants.

7. A method of changing a symbolic character to a variant character thereof for entering information or messages in a mobile device, wherein the mobile device comprises:

a keypad having a plurality of first keys for entering the symbolic character; and means, operatively connecting the keypad to a display, for displaying the symbolic character, wherein the keypad includes one second key different first keys for effecting said changing, said method comprising:

entering the symbolic character to be changed; and pressing the second key one or more times until the displayed symbolic character is replaced by the corresponding variant character, wherein the displayed symbolic character comprises an alphabetic character which has one or more tonal variant characters and one or more diacritical variant characters, and the keypad has a third key different from the first keys and second key, and wherein the second key is used to select the one or more diacritical variant characters and the third key is used to select the one or more tonal variant characters.

8. A mobile device having a keypad comprising first keys for entering a symbolic character; and a display operatively connecting the keypad for displaying the entered symbolic character, wherein the keypad includes one second key different from the first keys for changing the entered symbolic character to a variant thereof by pressing the second key, said mobile device comprising:

means, responsive to said pressing and the entered symbolic character, for choosing the variant character corresponding to the entered symbolic character for providing a signal indicating the chosen variant character; and means responsive to the signal, for causing the chosen variant character to be displayed in place of the entered symbolic character, wherein the displayed symbolic character comprises an alphabetic character which has one or more tonal variant characters and one or more diacritical variant characters, and the keypad has a third key different from the first keys and second key, and the choosing means chooses the one or more diacritical variant characters based on the pressing of the second key and chooses the one or more tonal variant characters based on the pressing of the third key.

9. The mobile device of claim 8, comprising a game console.

10. The mobile device of claim 8 comprising a mobile phone.

11. A keypad for use in an electronic device having first keys for entering a symbolic character in the electronic device, wherein the electronic device has a display operatively connected to the keypad for displaying the entered symbolic character, said keypad comprising one second key different from the first keys for changing the entered symbolic character to a variant thereof when said second key is pressed one or more times, wherein the displayed symbolic character has one or more first variant characters and one or more second variant characters, and wherein the second key can be pressed in a first manner for choosing the one or more first variant characters and pressed in a second manner for choosing the one or more second variant characters.

12. The keypad of claim 11, wherein the first keys comprise alphanumeric keys, the second key comprises a star key and the third key comprises a pound key.

13. The keypad of claim 11, wherein the electronic device comprises a mobile phone.

14. The keypad of claim 11, wherein the electronic device comprises a game console.

15. A keypad for use in an electronic device having first keys for entering a symbolic character in the electronic device, wherein the electronic device has a display operatively connected to the keypad for displaying the entered symbolic character, said keypad comprising one second key different from the first keys for changing the entered symbolic character to a variant thereof when said second key is pressed one or more times, wherein the displayed symbolic character has one or more first variant characters and one or more second variant characters, and said keypad further comprises a third key different from the first keys and second key, and wherein the second key is used for choosing the one or more first variant characters and the third key is used for choosing the one or more second variant characters.

16. The keypad of claim 15, wherein the electronic device comprises a mobile phone.

17. The keypad of claim 15, wherein the electronic device comprises a game console.

* * * * *

UNITED STATES PATENT AND TRADEMARK OFFICE
CERTIFICATE OF CORRECTION

PATENT NO. : 6,868,280 B2
DATED : March 15, 2005
INVENTOR(S) : Savolainen et al.

It is certified that error appears in the above-identified patent and that said Letters Patent is hereby corrected as shown below:

Column 6,
Line 13, "far" should be -- for --.
Line 13, ";" should be -- : --.

Signed and Sealed this

Twenty-first Day of June, 2005

JON W. DUDAS
*Director of the United States Patent and Trademark Office*